(12) United States Patent
Sucher et al.

(10) Patent No.: US 7,996,890 B2
(45) Date of Patent: Aug. 9, 2011

(54) SYSTEM AND METHOD FOR TRUSTED COMMUNICATION

(75) Inventors: Steve Sucher, Redondo Beach, CA (US); Paul King, Newbury Park, CA (US); Rosie O'Neill, Los Angeles, CA (US); Christopher L. Goff, Redondo Beach, CA (US); Carrie Buse, Santa Monica, CA (US); Joy Burns, Redondo Beach, CA (US)

(73) Assignee: Mattel, Inc., El Segundo, CA (US)

( * ) Notice: Subject to any disclaimer, the term of this patent is extended or adjusted under 35 U.S.C. 154(b) by 788 days.

(21) Appl. No.: 12/037,845

(22) Filed: Feb. 26, 2008

(65) Prior Publication Data

US 2008/0235781 A1    Sep. 25, 2008

Related U.S. Application Data

(63) Continuation-in-part of application No. 11/697,356, filed on Apr. 6, 2007.

(60) Provisional application No. 60/904,064, filed on Feb. 27, 2007.

(51) Int. Cl.
*H04L 29/06* (2006.01)
(52) U.S. Cl. ......................................................... 726/9
(58) Field of Classification Search ........................ 726/9
See application file for complete search history.

(56) References Cited

U.S. PATENT DOCUMENTS

| 4,412,214 A | 10/1983 | Tanaka et al. |
| 4,978,216 A | 12/1990 | Liljegrem et al. |
| 5,298,297 A | 3/1994 | Takei |
| 5,746,602 A | 5/1998 | Kikinis |
| 6,055,032 A | 4/2000 | Osterhout et al. |
| 6,292,272 B1 | 9/2001 | Okauchi et al. |
| 6,314,574 B1 | 11/2001 | Chan |
| 6,319,010 B1 | 11/2001 | Kikinis |
| 6,372,974 B1 | 4/2002 | Gross et al. |

(Continued)

FOREIGN PATENT DOCUMENTS

DE    4139729    6/1993

(Continued)

OTHER PUBLICATIONS

The International Search Report and Written Opinion for International Application No. PCT/US08/55038, mailed May 23, 2008.

*Primary Examiner* — Jacob Lipman
(74) *Attorney, Agent, or Firm* — Kolisch Hartwell, PC

(57) ABSTRACT

A trusted communication system and methods of ensuring trusted communications are provided. A portable memory device is configured to resemble a character, and a client is configurable to operate specifically with that portable memory device. The client may allow a user to access network resources related to other clients belonging to other users having portable memory devices. Each portable memory device may have stored therein a unique token. A token from one portable memory device may be associated with a token of another portable memory device, e.g., by operating the first portable memory device with a client configured to operate with the second portable memory device. When two tokens are associated, the client configured to operate with a portable memory device having one of those tokens may access network resources related to another of those tokens.

16 Claims, 5 Drawing Sheets

U.S. PATENT DOCUMENTS

| | | |
|---|---|---|
| 6,423,892 B1 | 7/2002 | Ramaswamy |
| 6,467,908 B1 | 10/2002 | Mines et al. |
| 6,496,808 B1 | 12/2002 | Aiello et al. |
| 6,525,767 B2 | 2/2003 | Saito et al. |
| 6,587,873 B1 | 7/2003 | Nobakht et al. |
| 6,612,501 B1 | 9/2003 | Woll et al. |
| 6,631,098 B2 | 10/2003 | Chang et al. |
| 6,738,901 B1 | 5/2004 | Boyles et al. |
| 6,745,223 B1 | 6/2004 | Nobakht et al. |
| 6,763,226 B1 | 7/2004 | McZeal |
| 6,773,325 B1 | 8/2004 | Mawle et al. |
| 6,785,716 B1 | 8/2004 | Nobakht |
| 6,792,464 B2 | 9/2004 | Hendrick |
| 6,802,757 B1 | 10/2004 | Sejnowski |
| 6,850,909 B1 | 2/2005 | Aiello et al. |
| 6,934,841 B2 | 8/2005 | Boyles et al. |
| 6,979,210 B2 | 12/2005 | Regen et al. |
| 6,996,636 B2 | 2/2006 | Hung et al. |
| 7,010,808 B1 | 3/2006 | Leung et al. |
| 7,037,166 B2 | 5/2006 | Shrock et al. |
| 7,046,297 B2 | 5/2006 | Chou |
| 7,083,095 B2 | 8/2006 | Hendrick |
| 7,085,937 B1 | 8/2006 | Rezvani et al. |
| 7,111,051 B2 | 9/2006 | Nobakht et al. |
| 7,113,220 B1 | 9/2006 | Misawa et al. |
| 7,143,133 B2 | 11/2006 | Liu et al. |
| 7,151,664 B2 | 12/2006 | Hosey |
| 7,158,953 B1 | 1/2007 | DeMello et al. |
| 7,162,736 B2 | 1/2007 | Koistinen et al. |
| 7,170,486 B2 | 1/2007 | Lemel et al. |
| 7,170,828 B2 | 1/2007 | Estevez |
| 7,231,044 B2 * | 6/2007 | Dube .......................... 380/258 |
| 2002/0020745 A1 * | 2/2002 | Yap et al. .................... 235/451 |
| 2002/0159601 A1 | 10/2002 | Bushmitch et al. |
| 2002/0166060 A1 | 11/2002 | Hsieh et al. |
| 2003/0090588 A1 | 5/2003 | Wu |
| 2003/0177367 A1 * | 9/2003 | King et al. ................... 713/185 |
| 2004/0003150 A1 | 1/2004 | Deguchi |
| 2004/0043806 A1 | 3/2004 | Kirby et al. |
| 2004/0051733 A1 | 3/2004 | Katzir |
| 2004/0088351 A1 | 5/2004 | Liu et al. |
| 2004/0103317 A1 | 5/2004 | Burns |
| 2004/0130657 A1 | 7/2004 | Hsu |
| 2004/0153557 A1 | 8/2004 | Shochet |
| 2004/0174452 A1 | 9/2004 | Kinemura et al. |
| 2004/0210758 A1 | 10/2004 | Jang et al. |
| 2004/0218051 A1 | 11/2004 | Hsu |
| 2005/0012850 A1 | 1/2005 | Wang |
| 2005/0012853 A1 | 1/2005 | Wang |
| 2005/0024526 A1 | 2/2005 | Wang |
| 2005/0060266 A1 | 3/2005 | DeMello et al. |
| 2005/0086389 A1 | 4/2005 | Chang |
| 2005/0162545 A1 | 7/2005 | Jeon |
| 2005/0228782 A1 | 10/2005 | Bronstein et al. |
| 2005/0289646 A1 | 12/2005 | Zimmer et al. |
| 2006/0015932 A1 | 1/2006 | Ballinger et al. |
| 2006/0041934 A1 | 2/2006 | Hetzler |
| 2006/0064761 A1 | 3/2006 | Multerer et al. |
| 2006/0130129 A1 | 6/2006 | Dai et al. |
| 2006/0136996 A1 | 6/2006 | Wang et al. |
| 2006/0143716 A1 | 6/2006 | Ikemoto |
| 2006/0150257 A1 | 7/2006 | Leung et al. |
| 2006/0168653 A1 | 7/2006 | Contrera |
| 2006/0172787 A1 | 8/2006 | Ellis |
| 2006/0197753 A1 | 9/2006 | Hotelling |
| 2006/0242306 A1 | 10/2006 | Boro |
| 2006/0287110 A1 | 12/2006 | Klitsner et al. |
| 2007/0005969 A1 * | 1/2007 | Fullerton ...................... 713/168 |
| 2007/0006290 A1 | 1/2007 | Li |
| 2007/0022473 A1 | 1/2007 | Hird |
| 2007/0033402 A1 | 2/2007 | Williams |
| 2007/0038319 A1 | 2/2007 | Moon |
| 2007/0038320 A1 | 2/2007 | Moon |
| 2007/0051060 A1 | 3/2007 | Moore |
| 2007/0058832 A1 | 3/2007 | Hug |
| 2007/0061364 A1 | 3/2007 | Klein |
| 2007/0061759 A1 | 3/2007 | Klein |
| 2007/0067309 A1 | 3/2007 | Klein et al. |
| 2007/0067835 A1 | 3/2007 | Koistinen et al. |
| 2007/0073725 A1 | 3/2007 | Klein |
| 2007/0073726 A1 | 3/2007 | Klein |
| 2007/0073727 A1 | 3/2007 | Klein |
| 2007/0073728 A1 | 3/2007 | Klein |

FOREIGN PATENT DOCUMENTS

| | | |
|---|---|---|
| JP | 2001327765 | 11/2001 |
| JP | 2003216586 | 7/2003 |
| WO | 9908259 | 2/1999 |
| WO | 0067096 | 11/2000 |
| WO | 2004036807 | 4/2004 |

* cited by examiner

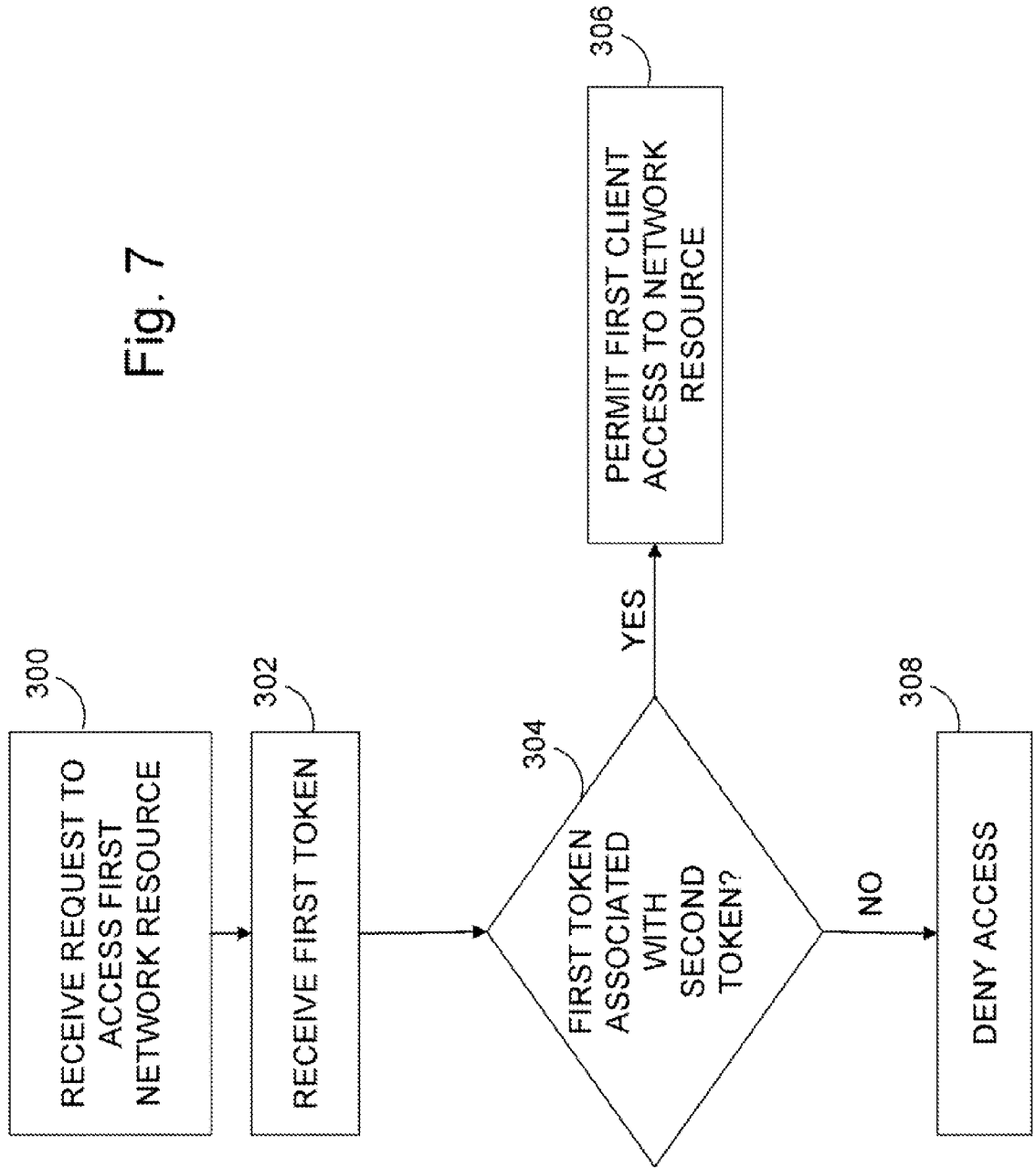

SYSTEM AND METHOD FOR TRUSTED COMMUNICATION

CROSS REFERENCE TO RELATED APPLICATIONS

This application is a continuation-in-part of U.S. patent application Ser. No. 11/697,356 entitled "Multifunction Removable Memory Device with Ornamental Housing" filed Apr. 6, 2007, the disclosure of which is incorporated herein by reference. This application further claims priority under 35 U.S.C. §119(e) to U.S. Provisional Patent Application No. 60/904,064 entitled "Multifunction Removable Memory Device with Ornamental Housing" filed Feb. 27, 2007, the disclosure of which is incorporated herein by reference.

BACKGROUND

As children spend more time on the Internet, the risk of children communicating with online predators increases. Predators take advantage of the freedom of communication and relative anonymity of the Internet to prey on these children. Most Internet applications lack the ability to control with whom a child communicates.

Some portable memory devices are configured to resemble characters, and may be used with personal computers to play games. Some online systems permit communication between users using various applications such as instant messaging, email, and social networking involving personal web pages. Other online systems incorporate systems and methods to ensure trusted communications.

Examples of online games with tokens are disclosed in U.S. Pat. No. 6,372,974; U.S. Pat. No. 6,423,892; U.S. Pat. No. 6,612,501; U.S. Pat. No. 6,631,098; U.S. Pat. No. 6,763,226; U.S. Pat. No. 6,979,210; U.S. Pat. No. 6,996,636 and U.S. Pat. No. 7,151,664, and Publication Nos. US20040003150; US20040043806; US20060287110 and WO0112285. Examples of dolls associated with computer applications are disclosed in U.S. Pat. No. 5,746,602; U.S. Pat. No. 6,319,010 and U.S. Pat. No. 6,773,325. Examples of portable memory device network authentication are disclosed in U.S. Pat. No. 7,111,051, as well as in Publication Nos. US20060041934 and US2006130129. The disclosures of the above-referenced patents and publications are incorporated herein by reference.

SUMMARY OF THE DISCLOSURE

The disclosed systems and methods may be used to control online communications between children having portable toy dolls.

For example, a child named "Suzie" owns a doll resembling a Barbie® brand doll, and she uses this doll by connecting her doll electronically to her personal computer at her home. Software on the computer or doll uses data stored on the doll to play certain computer games and access special Internet pages. This software also allows Suzie to create a personalized webpage, similar to those found on social networking sites like MySpace.com®. Suzie may save personal information to her webpage, including her name, age, address and photographs.

To prevent strangers and/or online predators from having access to Suzie's personal information, however, Suzie's webpage may be only visited in certain situations. For example, if another child ("Luanne") who is friends with Suzie in real life owns a second doll with similar electronic connections for use with computers, and brings her doll over to Suzie's house, Suzie may connect Luanne's doll to Suzie's computer. Suzie's software recognizes that Luanne's doll, and not Suzie's doll, is connected to Suzie's computer, and adds Luanne to Suzie's list of friends. Once Luanne goes back home with her doll, Luanne will be able to view Suzie's personal webpage simply by reconnecting Luanne's doll with Luanne's home computer. Similarly, Suzie may reconnect her doll to her computer, and from then on, Suzie may be able to view Luanne's personal webpage. Additionally, Suzie and Luanne may now be able to chat with one another using instant messaging.

A first example method of ensuring trusted communication between a plurality of clients on a computer network comprises the steps of: receiving from a first client over the computer network a first token identifying a first portable memory device with which the first client is configured to operate; receiving from the first client over the computer network a second token identifying a second portable memory device with which a second client is configured to operate; and associating the first token with the second token in a database.

Another example method of ensuring trusted communications between a plurality of clients over a computer network comprises the steps of: receiving from a first client configured to operate with a first portable memory device a request to access a network resource related to a second client configured to operate with a second portable memory device; receiving from the first client a first token identifying the first portable memory device; querying a database to determine whether the first token is associated with a second token identifying the second portable memory device, the database containing a plurality of tokens and associations therebetween; and upon determining that the first token is associated with the second token, permitting the first client access to the network resource related to the second client.

An example storage medium, readable by a first processor of a first computer system configured to operate with a first portable memory device identified by a first token, may have embodied therein a program of commands executable by the first processor, the program being adapted to be executed to: receive a second token from a second portable memory device with which a second processor of a second computer system is configured to operate; determine whether the second token matches the first token; and upon determining that the second token does not match the first token, store the second token in association with the first token; store the first token in the second portable memory device; provide access to a network resource related to the second processor.

An example trusted communication system may reside on a computer network and comprise: a first portable memory device identified by a first token; a first client configured to operate with the first portable memory device; a first network resource related to the first client; a second portable memory device identified by a second token; a second client configured to operate with the second portable memory device; a database configured to store tokens and associations therebetween; and a trusted communication server configured to receive a request from the second client to access the first network resource, the request including the second token, and query the database to determine whether there is an association between the second token and the first token; wherein upon a determination that the database server contains an association between second token and the first token, the trusted communication server permits the second client access to the first network resource.

BRIEF DESCRIPTION OF THE DRAWINGS

FIG. 7 depicts a schematic diagram of another example method of ensuring trusted communications.

DETAILED DESCRIPTION OF VARIOUS EMBODIMENTS

A user may be provided with a portable memory device configured to resemble a character such as a cartoon character or another character popular with children. A user may also be provided with a client (e.g., a client computer program) configurable to operate specifically with that user's portable memory device. The client also may provide a user with the ability to access network resources related to other clients belonging to other users having portable memory devices.

Each portable memory device may have stored therein a unique token. A token from one portable memory device may be associated with a token of another portable memory device. When two or more tokens are associated, a user of a portable memory device having one of those tokens may be permitted access to network resources related to a user of another of those tokens. Associations between tokens may be stored by the client configured to operate with the portable memory device, or on a database accessible by a trusted communication server on a computer network, to control whether the client has access to a particular network resource related to another token.

Some network resources may allow a user to communicate with other users over a computer network. For example, a network resource may be an instant messaging application through which users may communicate. Other network resources may be user-controlled webpages, similar to webpages built by users of social networks such as MySpace.com®.

Figure 1:
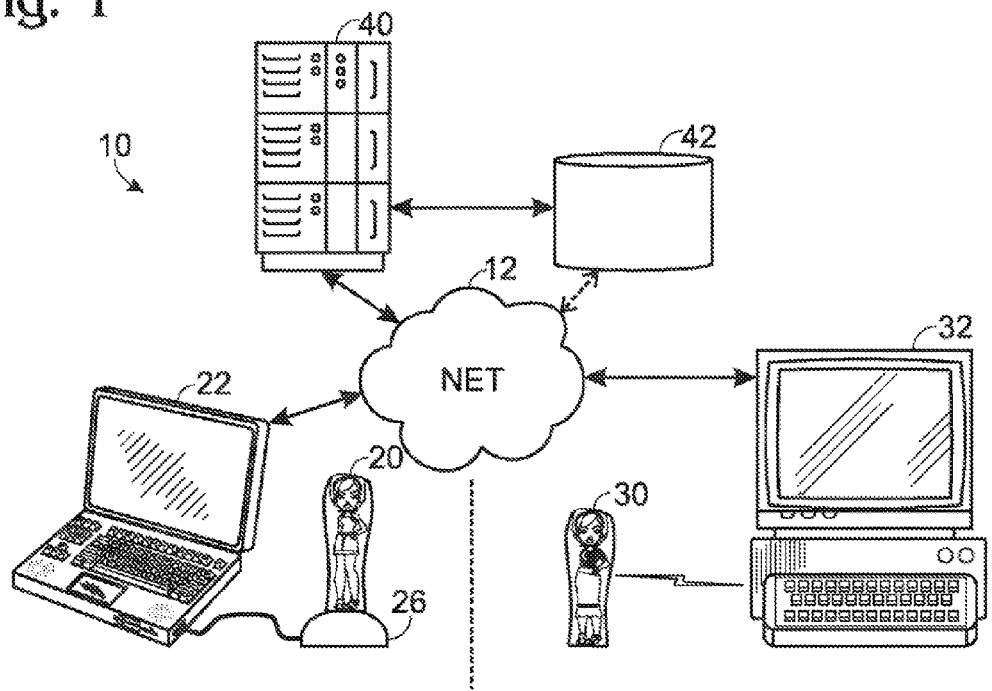
FIG. 1 depicts an example system including multiple clients, each configured to operate with one or more portable memory devices.

FIG. 1 depicts an example trusted communication system 10 implemented on a computer network 12. Computer network 12 may be a local area network, or a wide area network such as the Internet. System 10 may include a first portable memory device 20 with which a first client 22 is configured to operate. A first network resource 24 (see FIG. 3) may reside on computer network 12 and may be related to first client 22 as will be discussed below. In the embodiment shown in FIGS. 1-3, a first docking station 26 is operably coupled to first client 22, and may be configured to connect with portable memory devices, such as first portable memory device 20, so that first client 22 may communicate with portable memory devices.

As used herein, the term "client" may refer either to a client computer program, or the personal computer on which a client computer program executes. For example, when a user of first client 22 purchases first portable memory device 20, that user may also receive first client 22 in the form of an installable computer program on a storage medium (e.g., CD-ROM). The user may install first client 22 onto his or her personal computer so that the personal computer thereafter executes first client 22. The personal computer, which now may be referred to as first client 22, may be connected to computer network 12 using various methods, such as Ethernet, wireless or the like.

Figure 4:
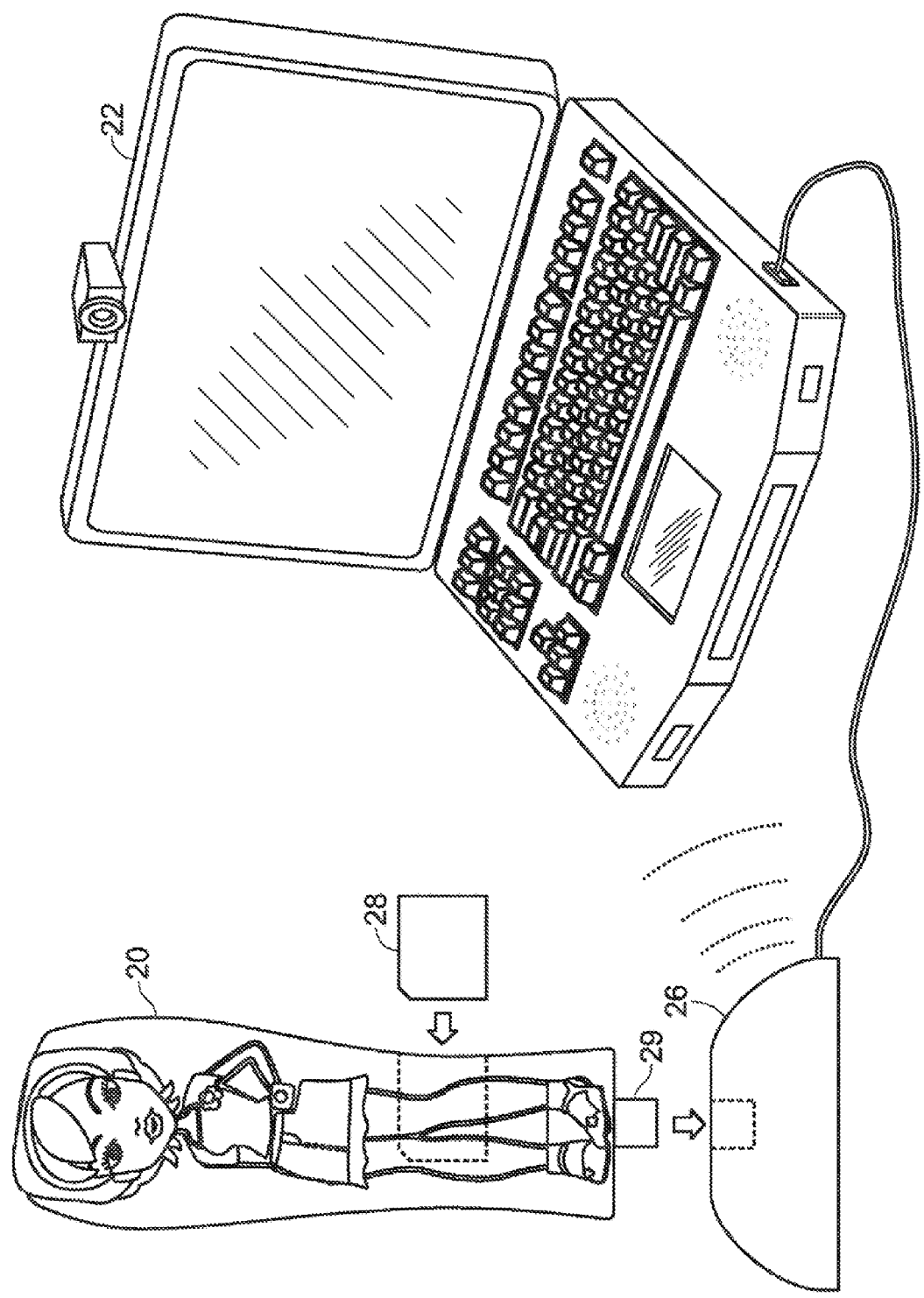
FIG. 4 depicts a removable toy in the form of a figurine connected to a docking station, which is in turn connected to a personal computer.

As best seen in FIG. 4, portable memory devices such as first portable memory device 20 may resemble characters. They may have a memory component 28, which may be permanently installed into the device, or removable, as shown in FIG. 4. Memory component may have stored therein, among other things, information related to the character the portable memory device resembles.

First portable memory device 20 also may have stored in memory component 28 a first token which uniquely identifies first portable memory device 20. Tokens may be any piece of data, such as a string of computer-readable characters, which uniquely identifies a portable memory device such as first portable memory device 20. Tokens may be used to identify clients, such as first client 22, or users thereof, on computer network 12.

Docking station 26 may be operably coupled to first client 22 using various methods, such as Universal Serial Bus ("USB"), Bluetooth, serial, parallel, 802.11 (WiFi) or FireWire. In FIG. 1, first docking station 26 is shown connected to first client 22 via a wire. Portable memory devices, such as first portable memory device 20, may be configured to connect to docking station 26 using connectors, such as connector 29 (see FIG. 4), which may take various forms, including USB, Bluetooth, serial, parallel, 802.11 or FireWire. In some embodiments, first portable memory device 20 may be configured to connect to docking station 26 using the same method as docking station 26 uses to connect to first client 22. When first portable memory device 20 is connected to docking station 26, first client 22 may transfer data to and from first portable memory device 20. Such transferring of data between clients and portable memory devices is referred to herein as "operating."

Clients such as first client 22 may be configured to operate with a specific portable memory device having a particular token. For example, a user of first client 22 may be prompted to "register" first portable memory device 20 with first client 22, at which time first client 22 may obtain and store the first token. In embodiments where first client 22 is executing on a personal computer running a Microsoft® operating system (e.g., Windows XP®, Vista®), first client 22 may store the first token in the personal computer's registry. Additionally or alternatively, first client 22 may store the first token in a file on a portion of the personal computer's hard drive accessible to first client 22. However first client 22 stores the first token, first client 22 thereafter may be configured to operate specifically with first portable memory device 20. First client 22 may operate temporarily with other portable memory devices, but such operation may be limited as will be discussed below.

Trusted communication system 10 may include other portable memory devices, such as a second portable memory device 30, which may be identical to, similar to, or different from first portable memory device 20. For example, second portable memory device 30 may resemble a different character than first portable memory device 20. Second portable memory device 30 may store a second token which is different from first token and uniquely identifies second portable memory device 30.

A second client 32, which may be a dedicated device or a computer program executing on a personal computer different from a personal computer on which first client 22 is executing, may be configured to operate with second portable memory device 30 in much the same way that first client 22 is configured to operate with first portable memory device 20. Second client 32 may be connected to computer network 12 using known methods such as Ethernet, wireless or the like. Computer network 12 may include a second network resource 34 (see FIG. 3) which is related to second client 32. Because clients are configured to operate with specific portable memory devices, it can be said that network resources are both related to clients as well as the tokens identifying the portable memory devices with which the clients are configured to operate.

In some embodiments, portable memory devices may connect to clients without the aid of a docking station. For example, in FIGS. 1-3, second portable memory device 30 may connect directory to second client 32 using various methods, such as the wireless connection shown in FIGS. 1-3, or via a wired connection such as a USB, serial, parallel or FireWire connection.

Network resources such as first network resource 24 and second network resource 34 may be various network applications related to clients. For example, in FIG. 3, first network resource 24 is an instant messaging application through which first client 22 and second client 32 may communicate. Regarding such a two-way communication application, it can be said that first network resource 24 is also related to whomever first client 22 is in communication with, such as second client 32.

Figure 3:
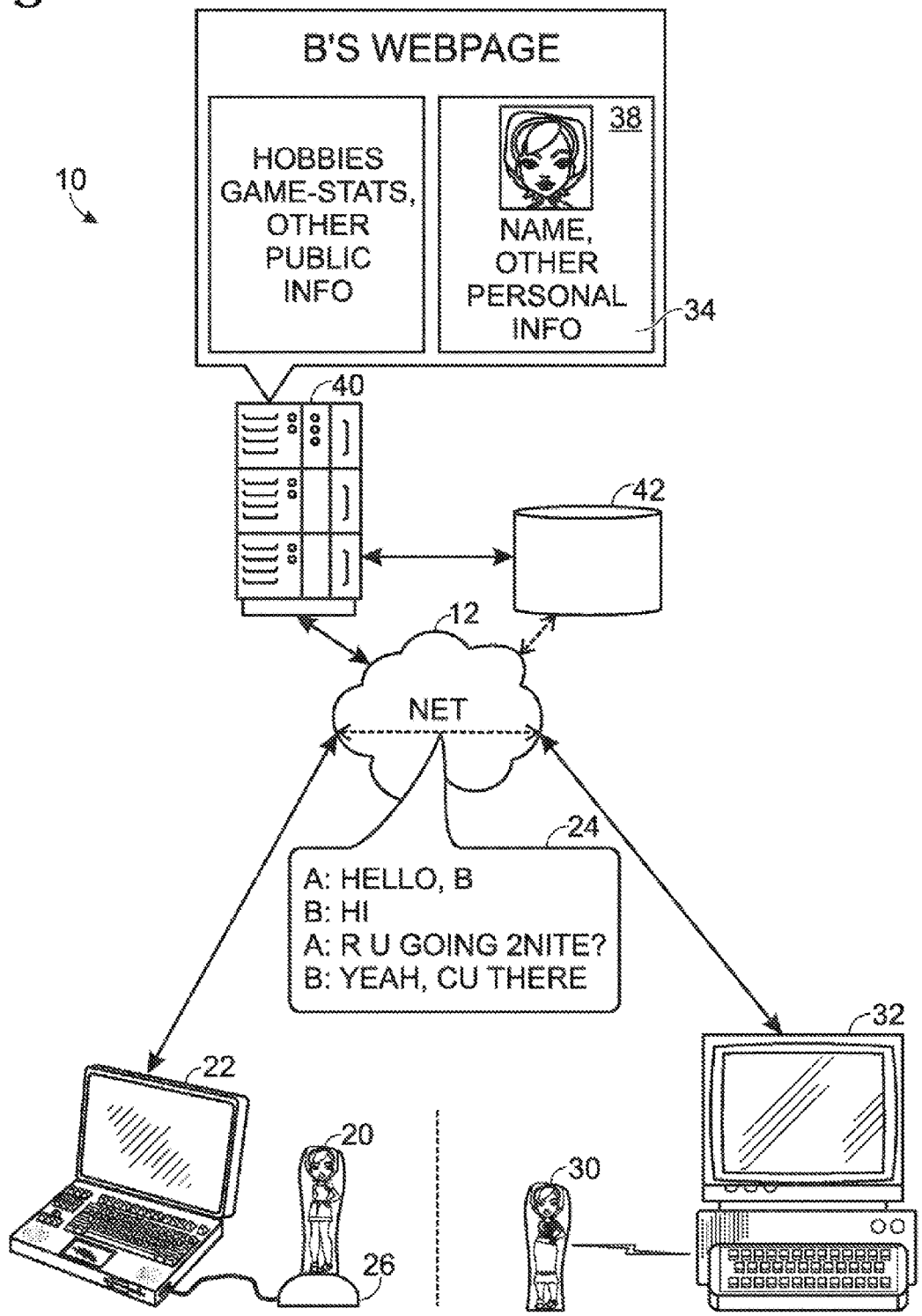
FIG. 3 depicts the system of FIG. 2 after the second portable memory device has operated with the first client and is now operating with a second client configured to operate with the second portable memory device.

Second network resource 34 in FIG. 3 is a first portion 38 of a web page created by a user of second client 32. First portion 38 may include personal information about the user of second client 32. Such personal information may include the user's name, age, address, photographs and other similar information that should not be accessible to strangers. Other network resources may include email services, file exchange services, online gaming services (e.g., massively multiplayer online role-playing games) and the like.

Trusted communication system 10 also may include a trusted communication server 40 which may include or be in communication with a database 42 configured to store tokens and associations therebetween. Trusted communication server 40 may be a server computer having one or more processors, and memory with instructions stored therein. The instructions may cause the processor(s) to ensure trusted communications among clients such as first client 22 and second client 32 using methods described below.

Figure 2:
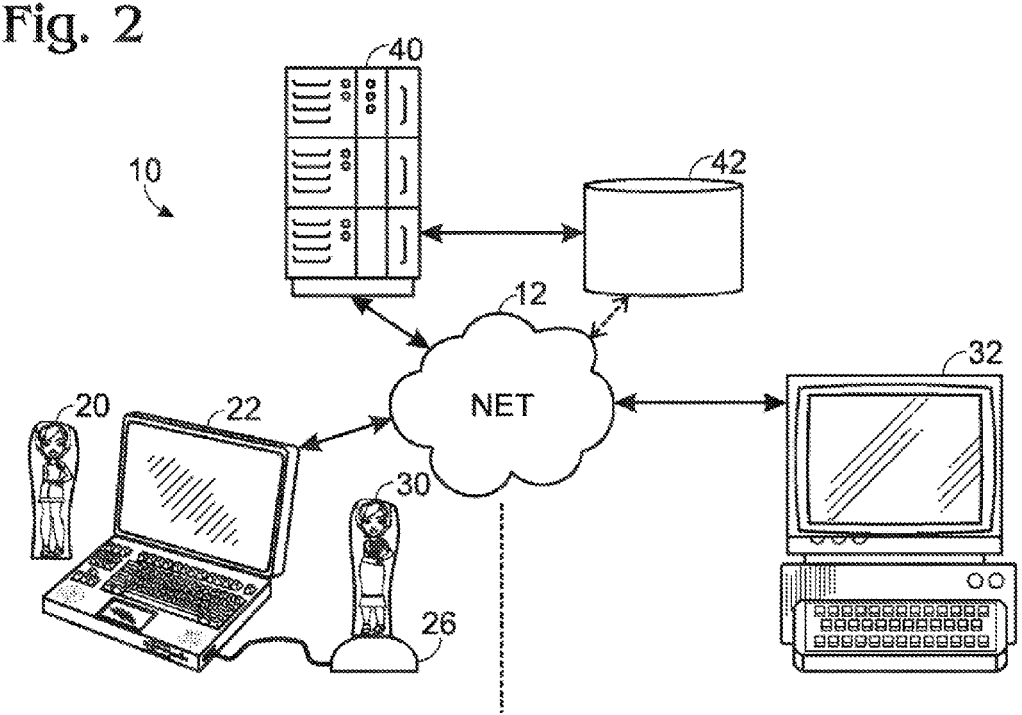
FIG. 2 depicts the system of FIG. 1 wherein a client configured to operate with a first portable memory device is depicted temporarily operating with a second portable memory device.

Trusted communication server and/or database 42 may be connected to computer network 12. In FIGS. 1-3, trusted communication server 40 is connected to computer network 12, and database 42 is connected to trusted communication server 40. Database 42 additionally or alternatively may be executing on the same computer as trusted communication server 40. Moreover, as shown by the dotted arrow in FIGS. 1-3, database may be connected to and communicate with trusted communication server 40 over computer network 12.

Trusted communication server 40 may be configured to ensure that clients are permitted to access network resources related to other clients if there is an association between the tokens identifying the portable memory devices with which the clients are configured to operate. For example, database 42 may store an association between the first token identifying first portable memory device 20 and the second token identifying second portable memory device 30. If first client 22 attempts to access second network resource 34 related to second client 32, trusted communication server 40 may verify that the association between the first token and the second token exists before permitting first client 22 access to second network resource 34. Likewise, if second client 22 attempts to access first network resource 24 related to first client 22, trusted communication server may verify that the association between the second token and the first token exists before permitting second client 32 access to first network resource 24.

In some embodiments where a network resource is an instant messaging application, there may be more than one level of chat. For example, there may be a public level of chat which permits communication among any clients, regardless of whether the portable memory devices associated therewith and those devices' tokens are associated. Some clients and/or trusted communication servers may not permit the communication of personal information over public levels of chat. The communication of personal information may be prevented by utilizing filters configured to block certain words, such as the user's name, address, age, telephone number, and the like.

There may also be a second, more secure level of chat, wherein only clients with tokens associated with one another may communicate. Personal information may be communicated over the more secure levels of chat.

The specific example shown in FIGS. 1-3 will now be described in detail. At a first location such as a first user's home, first client 22 may be configured to operate with first portable memory device 20. Similarly, at a second location such as a second user's home, second client 32 may be configured to operate with second portable memory device 30.

In FIG. 2, the second user has traveled to the home of the first user, and has connected her second portable memory device 30 to docking station 26. Under most circumstances, if one user visits the home of another user, it may be presumed that the two users are friends, and therefore should share a level of trust sufficient to permit them to communicate with one another online.

To establish this trust, first client 22 may temporarily operate with second portable memory device 30 as seen in FIG. 2 to create an association between the first token and the second token. In embodiments implementing the method shown in FIG. 5, first client 22 may store the second token locally in association with the first token. In embodiments implementing the methods depicted in FIGS. 6 and 7, first client 22 may communicate the first token (which first client 22 already has stored by virtue of being configured to operate with first portable memory device 20) identifying first portable memory device 20 and the second token identifying second portable memory device 30 to trusted communication server 40. Trusted communication server 40 may then create and/or store an association between the first and second tokens in database 42.

In some embodiments, clients may be required to communicate, along with the first and second tokens, a credential (e.g., password) for authenticating the user of first client 22. This provides an additional layer of security to ensure that the user of first client 22, and not an imposter, is approving of the association between the first and second tokens. Other embodiments may further require credentials for authenticating the user of second client 32 (and owner of second portable memory device 30) as well, for additional security.

In FIG. 3, the second user has returned home and connected second portable memory device 30 to second client 32 (via wireless method such as Bluetooth). With an association between the first and second tokens stored in database 42, first client 22 may now be permitted to access second network resource 34, which as described above is a first portion 38 of a webpage created by the second user. Similarly, first client 22 and second client 32 may be permitted access to first network resource 24, which is an instant messaging application. As shown in FIG. 3, first user and second user are communicating about plans for the evening.

Figure 5:
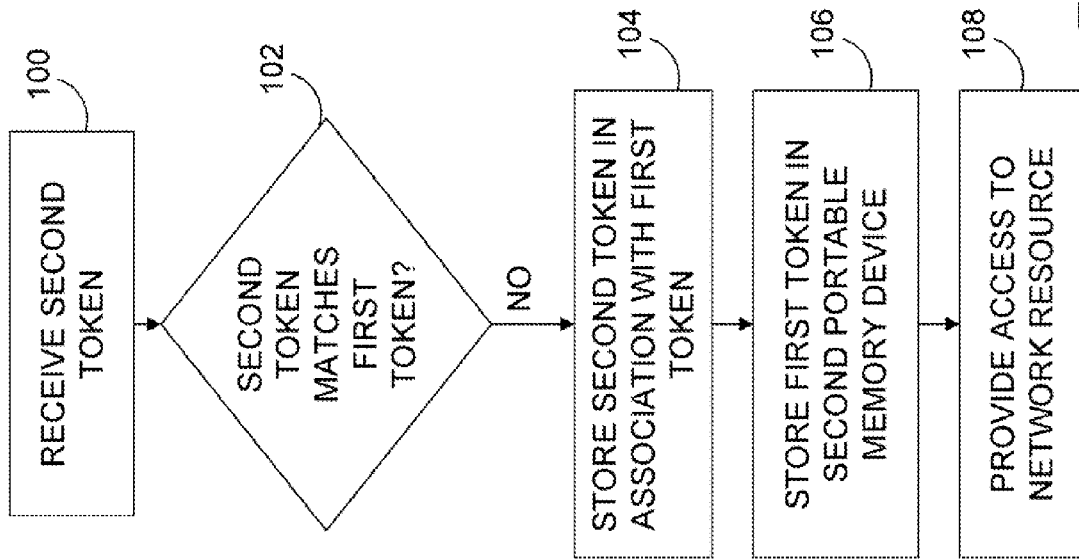
FIG. 5 depicts a schematic diagram of an example method of ensuring trusted communications.

An example method where first client 22 stores the second token locally in association with the first token is shown in FIG. 5. In step 100, first client 22 may operate temporarily with second portable memory device 30 to receive the second token, and determine whether the second token matches the first token in step 102. Upon determining that the second token does not match the first token, in step 104, first client 22 may store the second token in association with the first token. In some embodiments, first client 22 may also store the first token in second portable memory device 30 in step 106. In either case, in step 108, first client 22 may provide access to second network resource 34 related to second client 32.

In embodiments where first client 22 stores the first token in second portable memory device 30, second client 32 may be configured to detect the first token when second portable memory device 30 is connected to second client 32. Second client 32 may then store the first token in association with the second token, and thereafter permit access to network resources related to first client 22.

Figure 6:
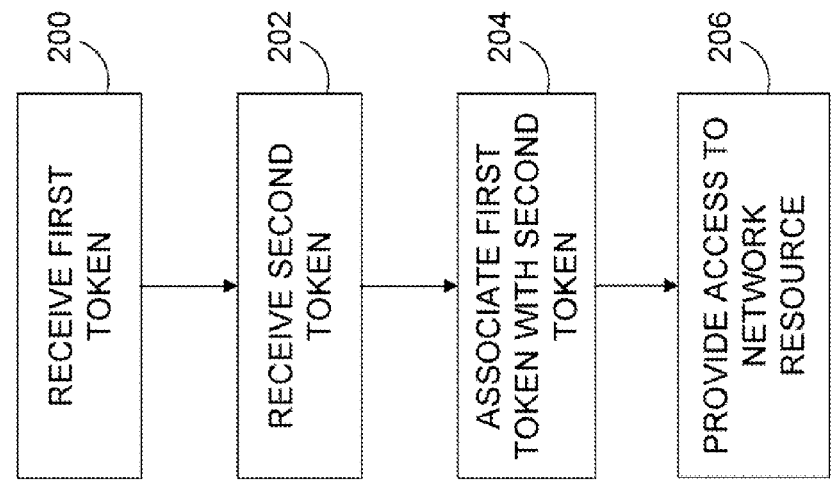
FIG. 6 depicts a schematic diagram of another example method of ensuring trusted communications.

An example method where first client 22 communicates the first and second tokens to trusted communication server 40 is shown in FIG. 6. In step 200, trusted communication server 40 may receive the first token, and in step 202, trusted communication server 40 may receive the second token. In step 204, trusted communication server 40 may associate the first token with the second token in database 42. In step 206, trusted communication server 40 may provide to first client 22 access to a network resource related to second client, such as second network resource 34. Where a network resource related to second client 32 is a two-way communications application, such as an instant messaging application, trusted communication server 40 may provide access to both first 22 and second 32 clients to the network resource.

In some embodiments, access to various network resources may be provided using the method shown in FIG. 7. In step 300, trusted communication server 40 may receive from first client 22 configured to operate with first portable memory device 20 a request to access a network resource related to second client 32, such as second network resource 34. In step 302, trusted communication server 40 may receive from first client 22 a first token identifying first portable memory device 20. In step 304, trusted communication server 40 may query a database such as database 42 to determine whether the first token is associated with a second token identifying second portable memory device 30. Upon determining that the first token is associated with the second token, in step 306, trusted communication server 40 may permit first client 22 access to second network resource 34 related to second client 32. If the tokens are not associated in database 42, trusted communication server 40 may deny first client 22 access to second network resource 34.

Accordingly, while embodiments have been particularly shown and described with reference to the foregoing disclosure, many variations may be made therein. The foregoing embodiments are illustrative, and no single feature or element is essential to all possible combinations that may be used in a particular application. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate or imply a required or limited number of such elements, and do not indicate a particular position or order of such elements unless otherwise specifically stated.

What is claimed is:

1. A trusted communication system residing on a computer network and comprising:
   a first portable memory device identified by a first token;
   a first client configured to operate with the first portable memory device;
   a first network resource related to the first client;
   a second portable memory device identified by a second token;
   a second client configured to operate with the second portable memory device;
   a database configured to store tokens and associations therebetween; and
   a trusted communication server configured to receive a request from the second client to access the first network resource, the request including the second token, and query the database to determine whether there is an association between the second token and the first token;
   wherein upon a determination that the database server contains an association between second token and the first token, the trusted communication server permits the second client access to the first network resource.

2. The system of claim 1 wherein the first client is a computer program executing on a first computer connected to a docking station to which portable memory devices are configured to connect, and the first client is configured to temporarily operate with the second portable memory device when the second portable memory device is connected to the docking station to communicate the first and second tokens to the database, and the database is configured to store an association between the first token and the second token.

3. The system of claim 1 wherein the second client is configured to temporarily operate with the first portable memory device to communicate the first and second tokens to the database, and the database is configured to store an association between the first token and the second token.

4. The system of claim 1 wherein the first network resource is an instant messaging application through which the first and second clients exchange instant messages.

5. The system of claim 1 wherein the first network resource is a first portion of a personal webpage created by a user of the first client, wherein the first portion of the personal webpage includes personal information about the user of the first client.

6. The system of claim 1 wherein the first client is configured to temporarily operate with the second portable memory device to communicate the first and second tokens to the database, and the database is configured to store an association between the first token and the second token.

7. The system of claim 6 wherein the first client is configured to store a flag on the second portable memory device, the flag indicating that there is an association between the first token and the second token.

8. The system of claim 7 wherein the second client is configured to, upon operating with the second portable memory device and detecting the flag stored therein, prompt a user of the second client to access the first network resource related to the first client.

9. A trusted communication system residing on a computer network and comprising:
   a first token identifying a first portable memory device;
   a second token identifying a second portable memory device;
   a database configured to store tokens and associations therebetween; and
   a trusted communication server configured to (i) receive a request from a second client, the second client configured to operate with the second portable memory device, to allow the second client to access a first network resource, the first network resource related to a first client configured to operate with the first portable memory device, the request including the second token, and (ii) query the database to determine whether there is an association between the second token and the first token;

wherein upon a determination that the database server contains an association between second token and the first token, the trusted communication server permits the second client access to the first network resource.

10. The system of claim 9 wherein the first client is a computer program executing on a first computer connected to a docking station to which portable memory devices are configured to connect, and the first client is configured to temporarily operate with the second portable memory device when the second portable memory device is connected to the docking station to communicate the first and second tokens to the database, and the database is configured to store an association between the first token and the second token.

11. The system of claim 9 wherein the second client is configured to temporarily operate with the first portable memory device to communicate the first and second tokens to the database, and the database is configured to store an association between the first token and the second token.

12. The system of claim 9 wherein the first network resource is an instant messaging application through which the first and second clients exchange instant messages.

13. The system of claim 9 wherein the first network resource is a first portion of a personal webpage created by a user of the first client, wherein the first portion of the personal webpage includes personal information about the user of the first client.

14. The system of claim 9 wherein the first client is configured to temporarily operate with the second portable memory device to communicate the first and second tokens to the database, and the database is configured to store an association between the first token and the second token.

15. The system of claim 14 wherein the first client is configured to store a flag on the second portable memory device, the flag indicating that there is an association between the first token and the second token.

16. The system of claim 15 wherein the second client is configured to, upon operating with the second portable memory device and detecting the flag stored therein, prompt a user of the second client to access the first network resource related to the first client.

* * * * *